United States Patent [19]
Huang

[11] Patent Number: 5,956,805
[45] Date of Patent: Sep. 28, 1999

[54] RETRACTABLE WHEEL ASSEMBLY FOR LUGGAGE CASES

[76] Inventor: Liang-Yuan Huang, P.O. Box 82-144, Taipei, Taiwan

[21] Appl. No.: 09/136,015

[22] Filed: Aug. 19, 1998

[51] Int. Cl.⁶ ..................................................... B60B 33/06
[52] U.S. Cl. ..................................................... 16/33; 16/19
[58] Field of Search ................................... 16/33, 32, 44, 16/19, 18 R, 30

[56] References Cited

U.S. PATENT DOCUMENTS

| | | | |
|---|---|---|---|
| 2,880,448 | 4/1959 | Maguire | 16/19 |
| 3,349,425 | 10/1967 | Rabelos | 16/44 |
| 5,575,036 | 11/1996 | May | 16/34 |

*Primary Examiner*—Chuck Y. Mah
*Attorney, Agent, or Firm*—A & J

[57] ABSTRACT

A retractrable wheel assembly for luggage cases includes an outer U-shaped member being rectangular in shape and having an open vertical side secured to a L-shaped bracket, an inner U-shaped member slidably fitted inside the outer U-shaped member, two springs connected between hooks of the outer U-shaped member and the inner U-shaped member, a wheel pivotally connected to a bottom of the inner U-shaped member, a positioner fixedly mounted within the inner U-shaped member, a V-shaped torsion spring having an intermediate portion fixedly mounted inside the positioner and two ends provided with two blocks configured to extend through the the openings of the positioner, the inner U-shaped member and the outer U-shaped member, and a string having an upper end extending out of the outer U-shaped member and a lower end engaged with the two ends of the V-shaped torsion spring.

5 Claims, 6 Drawing Sheets

RETRACTABLE WHEEL ASSEMBLY FOR LUGGAGE CASES

BACKGROUND OF THE INVENTION

1. Field of the Invention

This invention is related to an improved wheel assembly for a luggage case and in particular to one having a wheel which can be retracted into the corner of a luggage case when not in use.

2. Description of the Prior Art

It has been found that lifting and manually carrying luggage at airports, railway stations, hotels or other sites is a task which is generally disliked by travellers. Rental luggage carts are available at certain sites of this kind but the renting process is itself an inconvenience. Hence, efforts have heretofore been made to make the luggage itself wheelable. This typically consists of providing caster wheels at the surface of the case that faces downward when the case is in an upright position. However, the wheels of the case are often and easily damaged in transportaion thereby causing much inconvenience in use.

Therefore, it is an object of the present invention to provide an improved wheel assembly which enables the wheel to be retracted into the corner of a luggage case when not in use.

SUMMARY OF THE INVENTION

This invention is related to an improved wheel assembly for luggage cases.

According a preferred embodiment of the present invention, a retractrable wheel assembly for luggage cases includes an outer U-shaped member being rectangular in shape and having an open vertical side secured to a L-shaped bracket, an inner U-shaped member slidably fitted inside the outer U-shaped member, two springs connected between hooks of the outer U-shaped member and the inner U-shaped member, a wheel pivotally connected to a bottom of the inner U-shaped member, a positioner fixedly mounted within the inner U-shaped member, a V-shaped torsion spring having an intermediate portion fixedly mounted inside the positioner and two ends provided with two blocks configured to extend through the the openings of the positioner, the inner U-shaped member and the outer U-shaped member, and a string having an upper end extending out of the outer U-shaped member and a lower end engaged with the two ends of the V-shaped torsion spring.

It is the primary object of the present invention to provide a wheel assembly having a wheel which can be retracted into a corner of a luggage case when not in use.

It is another object of the present invention to provide a wheel assembly for luggage cases which can prevent the wheel from being damaged.

It is still another object of the present invention to provide a wheel assembly for luggage cases which is fit for practical use.

It is still another object of the present invention to provide a wheel assembly for luggage cases which is easy to use and simple in construction.

It is a further object of the present invention to provide a wheel assembly for luggage cases which is facile to manufacture.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
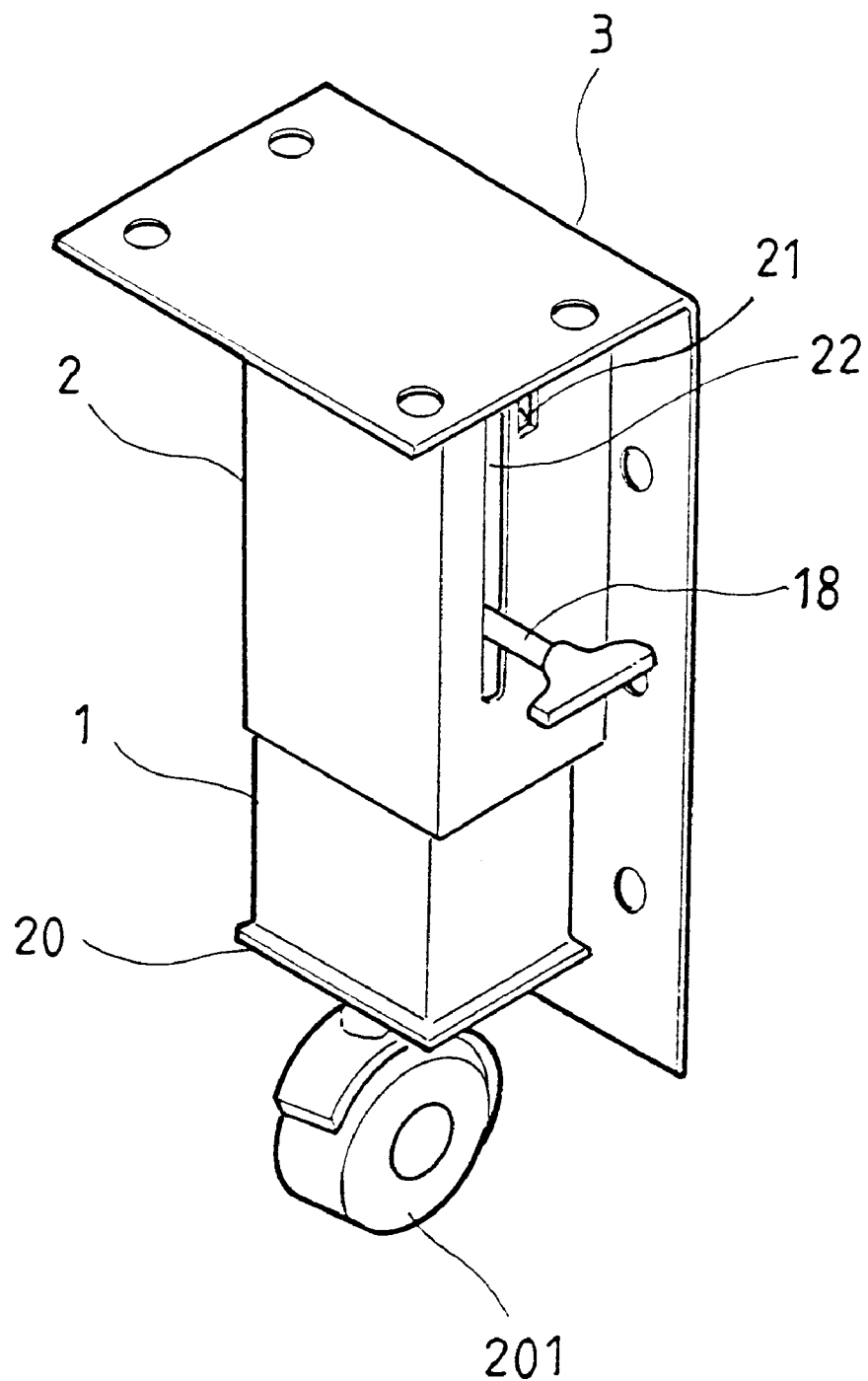
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
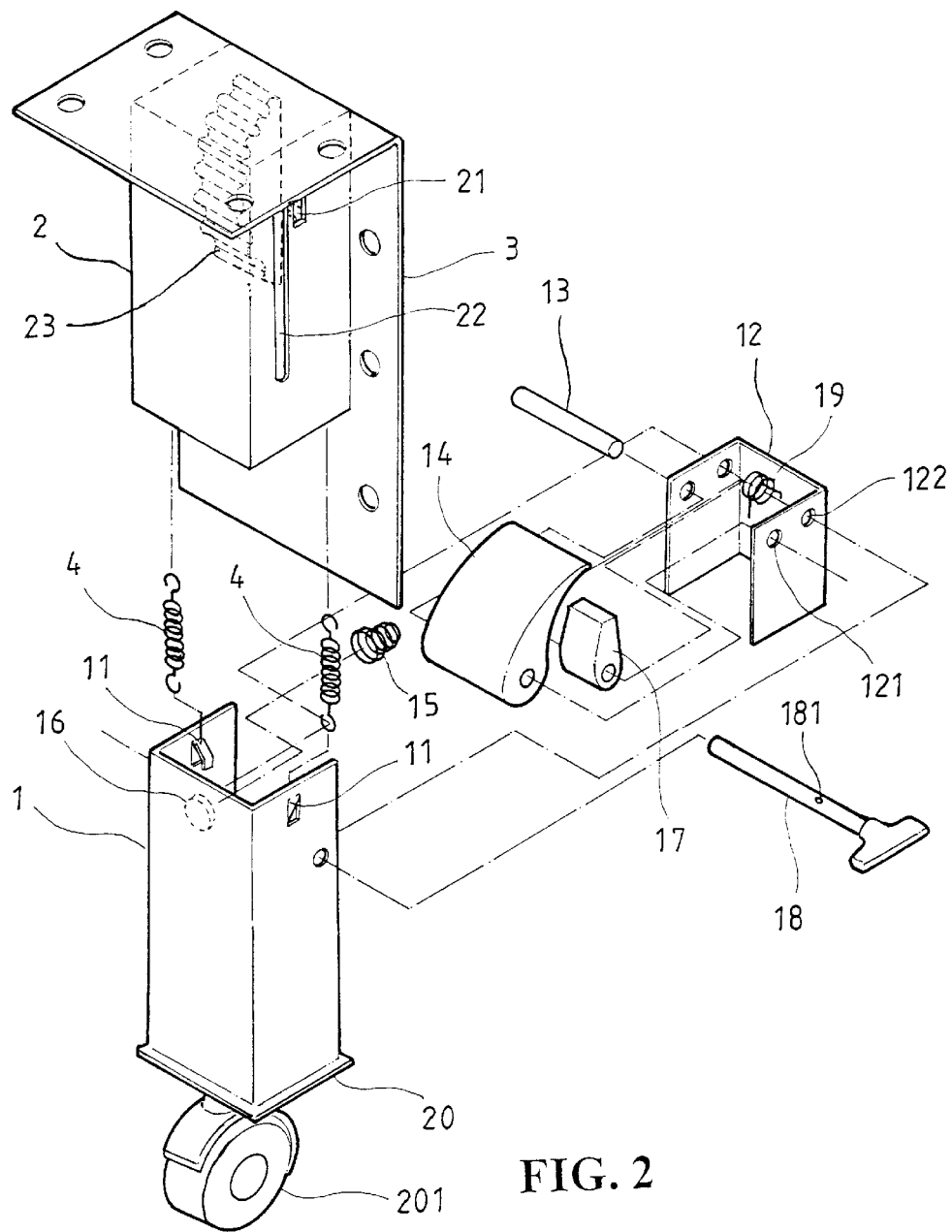
FIG. 2 is a perspective view illustrating the interior of the present invention.
Figure 3:
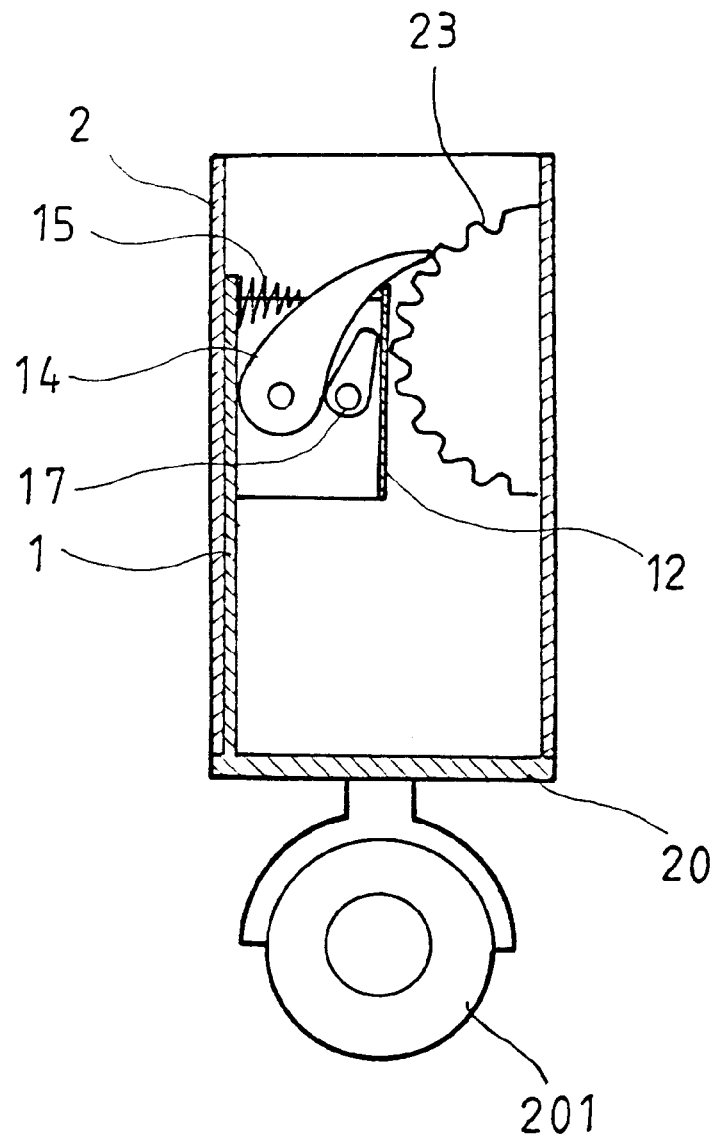
FIG. 3 is a sectional view of the present invention.
Figure 4:
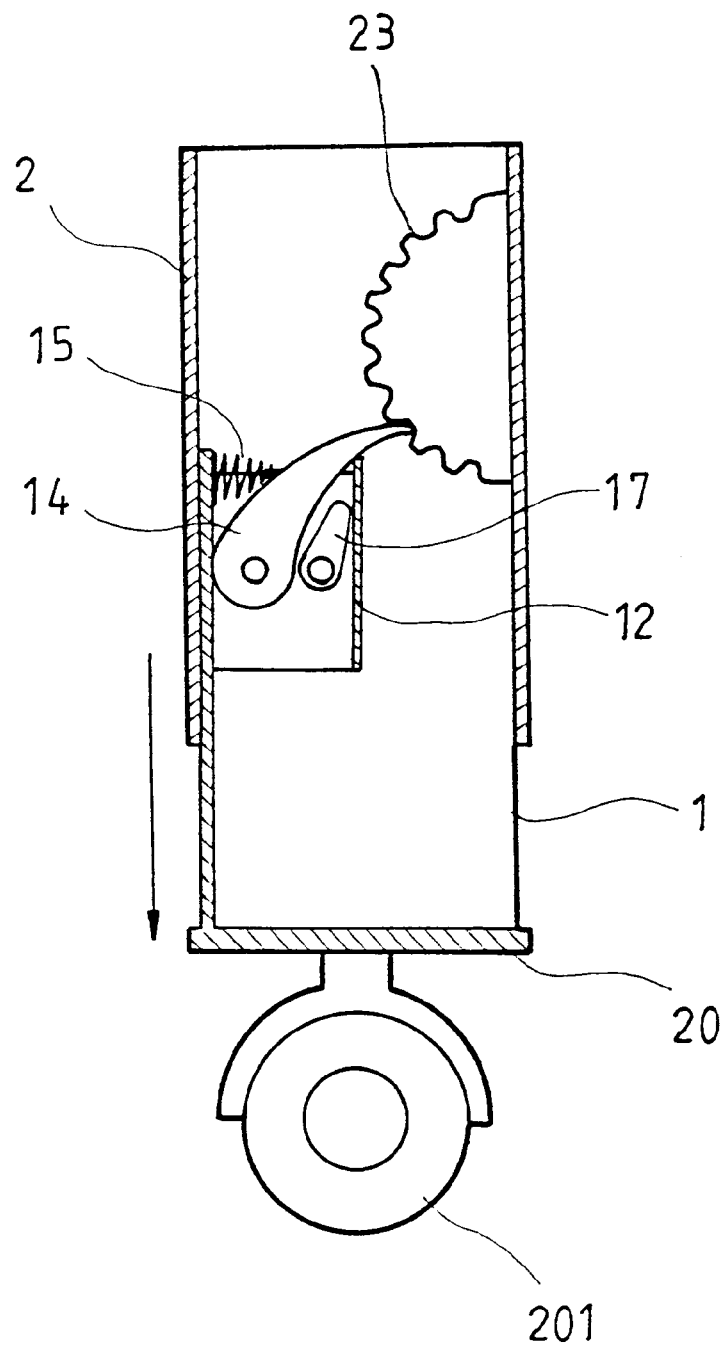
FIG. 4 is a sectional view illustrating the retracted position of the present invention.
Figure 5:
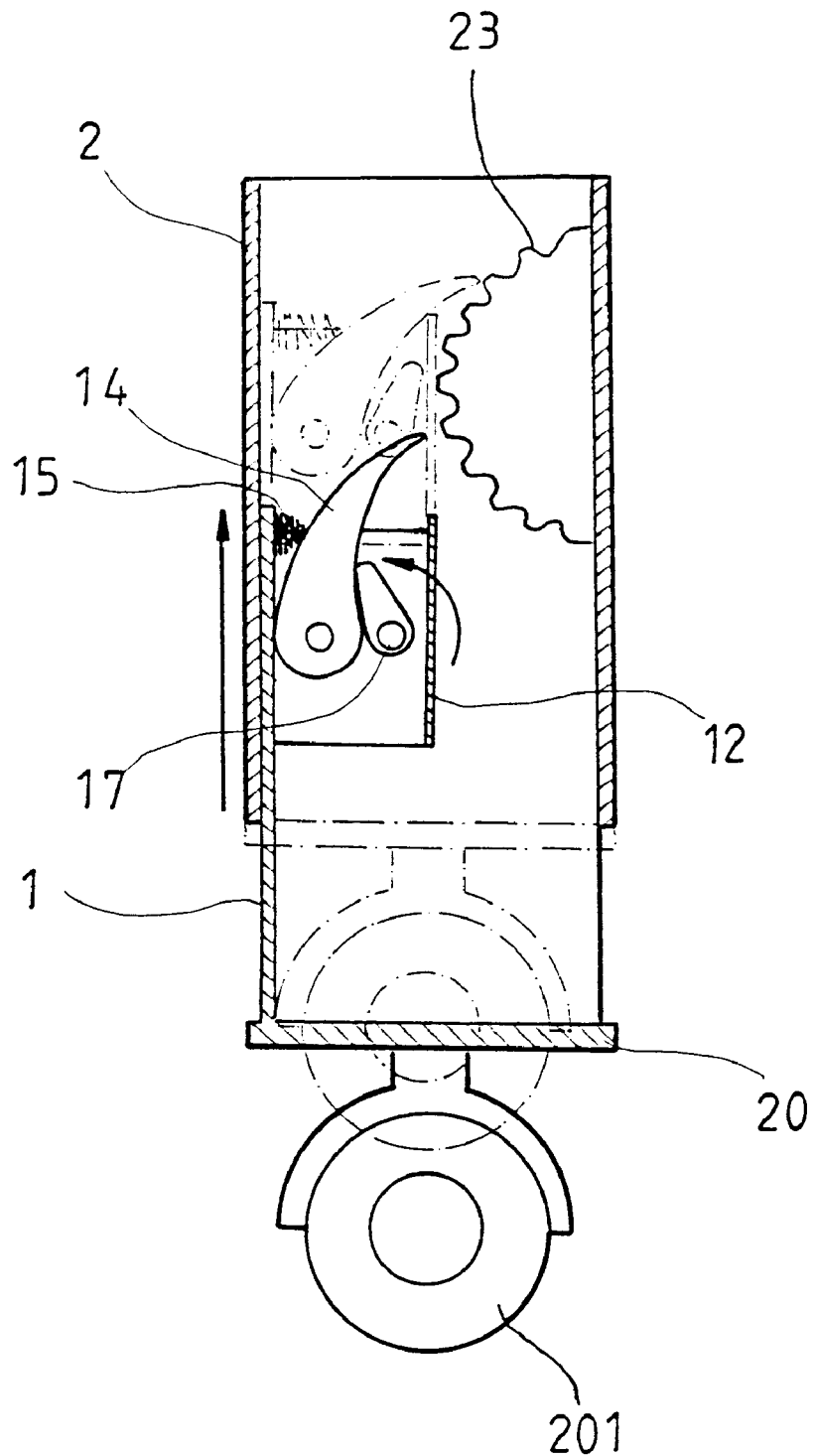
FIG. 5 is a sectional view illustrating the extended position of thy present invention.
Figure 6:
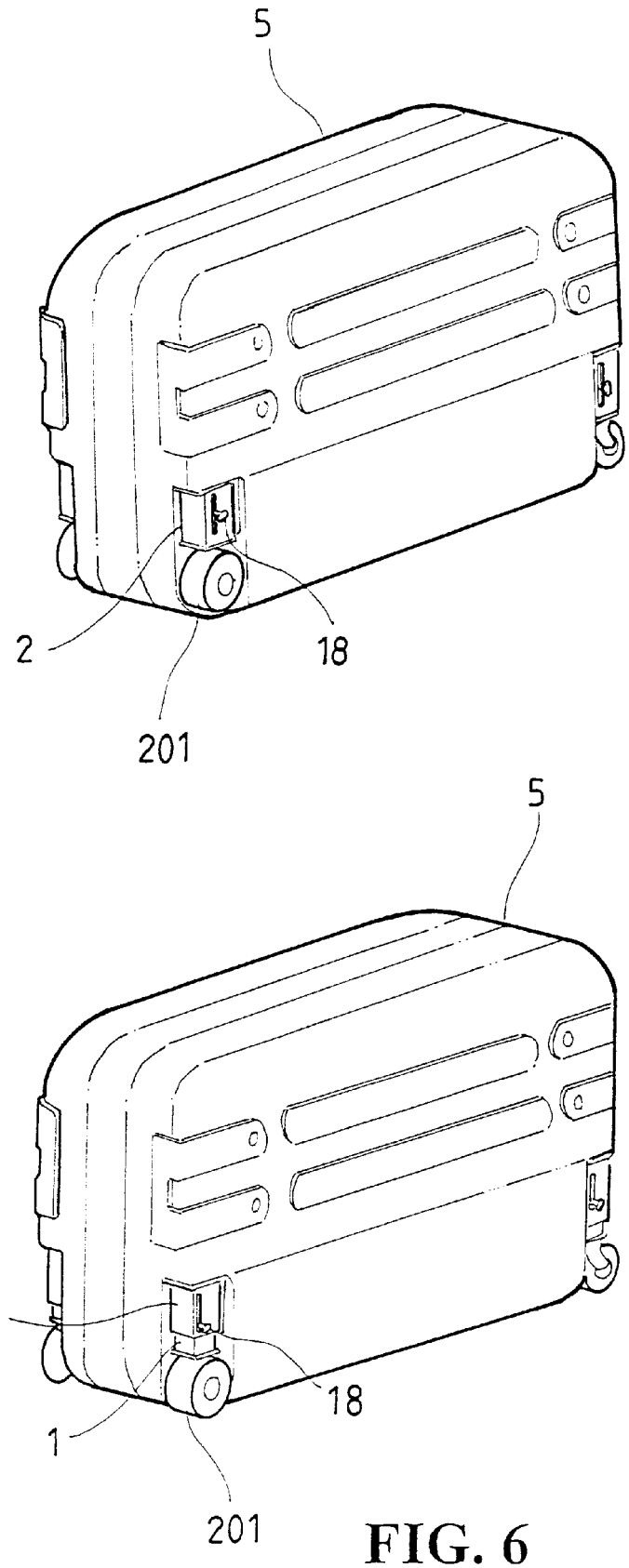
FIGS. 6A and 6B are different working views of the present invention.

With reference to the drawings and in particular to FIGS. 1, 2 and 3 thereof, the retractable wheel assembly for luggage cases according to the present invention generally comprises an inner U-shaped member 1, an outer U-shaped member 2, a positioner 40, and a V-shaped torsion spring 4.

The outer U-shaped member 2 is generally rectangular in shape and has an open vertical side welded or otherwise secured to a L-shaped bracket 3. Two inner opposite sides of the outer U-shaped member 2 is provided with two hooks 21 extending slopingly upwardly. The outer U-shaped member 2 has two aligned rectangular openings 22 below the hooks 21. The upper portion of the outer U-shaped member 2 is provided with a ceramic tubular member 23. The bottom of the horizontal portion of the L-shaped bracket 3 is provided with a triangular tubular member 24 aligned with the ceramic tubular member 23.

The inner U-shaped member 1 is also generally rectangular in shape and slightly smaller than the outer U-shaped member 2. The inner U-shaped member 1 is slidably fitted inside the outer U-shaped member 2. The inner opposite sides of the inner U-shaped member 1 is provided with two hooks 11 extending sloping downwardly. Two springs 5 are connected between the hooks 21 of the outer U-shaped member 2 and the hooks 11 of the inner U-shaped member 1 so that the inner U-shaped member 1 is pulled upwardly into the outer U-shaped member 2. The inner U-shaped member 1 has two aligned rectangular openings 12 below the two hooks 11 thereby enabling the inner U-shaped member 1 to be arranged at a position where the openings 12 of the inner U-shaped member 1 are in alignment with the openings 22 of the outer U-shaped member 2. The bottom of the inner U-shaped member 1 is provided with a stop plate 1 which is pivotally connected with a wheel 14.

The positioner 40 is a rectangular member configured to be welded or otherwise secured to the interior of the inner U-shaped member 1 and has two aligned openings (shown but not numbered) at two opposite sides. An inner side of the positioner 40 is formed with a tubular portion 402.

The V-shaped torsion spring 4 is formed with a loop (shown but not numbered) at the intermediate portion and two ends each provided with an eye 42. The two ends of the V-shaped torsion spring 4 are fixedly engaged with two blocks 41. A string 44 has an end extending through the ceramic tubular member 23 and the triangular oultet 24 of the outer U-shaped member 2 to engage with a magnetic member 441. The other end of the string 44 has two strands extending through the tubular portion 402 of the positioner 40 to engage with the two eyes 42 of the V-shaped torsion spring 4. The V-shaped torsion spring 4 is fixed within the positioner 40 by a screw 43 extending through the loop of the V-shaped torsion spring 4 to engage with an internally threaded tubular portion 401 of the positioner 40, with the blocks 41 fitted into the openings of the positioner 40. As the string 44 is pulled upwardly, the two ends of the V-shaped torsion spring 4 will be forced to move toward each other thereby moving the blocks 41 to go inwardly.

Referring to FIGS. 1, 4, 6A and 6B, the L-shaped bracket 3 is fastened to the outer corner of a luggage case by screws (not shown) extending through the holes 31 of the L-shaped bracket 3 into the luggage case. When desired to pull the luggage case, it is only necessary to pull the inner U-shaped member 1 outwardly so that the blocks 41 move into the rectangular openings 22 of the outer L-shaped member 2 thereby keeping the wheel 14 at a fixed position (see FIG. 4). When desired to withdraw the wheel 14 into the corner of the luggage case, it is only necessary to pull the string 44 to move the blocks 41 to go inwardly thereby releasing the outer L-shaped member 1 and in the meantime, the springs 5 will pull the inner U-shaped member 1 into the outer U-shaped member 2 thereby retracting the wheel 14 into the corner of the luggage case and therefore preventing the wheel 14 from being damaged inadvertently (see FIGS. 6A and 6B).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A retractrable wheel assembly for luggage cases comprising:

an outer U-shaped member being rectangular in shape and having an open vertical side secured to a L-shaped bracket, said outer U-shaped member having two inner opposite sides provided with two first hooks extending slopingly upwardly, and two aligned rectangular openings below said first hooks;

an inner U-shaped member being rectangular in shape and slightly smaller than said outer U-shaped member, said inner U-shaped member being slidably fitted inside said outer U-shaped member, two inner opposite side of said inner U-shaped member being provided with two second hooks extending slopingly downwardly, and having two aligned rectangular openings below said second hooks;

two springs each of which respectively connected between one of said first hooks of said outer U-shaped member and one of said second hooks of said inner U-shaped member;

a wheel pivotally connected to a bottom of said inner U-shaped member;

a positioner fixedly mounted within said inner U-shaped member and having two aligned openings;

a V-shaped torsion spring having an intermediate portion fixedly mounted inside said positioner and two ends of said torsion spring provided with two blocks configured to extend through said openings of said positioner, said openings of said inner U-shaped member and said openings of said outer U-shaped member; and a string having an upper end extending out of said outer U-shaped member and a lower end engaged with said two ends of said V-shaped torsion spring.

2. The retractable wheel assembly as claimed in claim 1, wherein said positioner has a fixed tubular portion for fixedly mounting said V-shaped torsion spring inside thereof.

3. The retractable wheel assembly as claimed in claim 1, wherein said outer U-shaped member has a ceramic tubular member for passage of said string.

4. The retractable wheel assembly as claimed in claim 1, wherein said L-shaped bracket is provided with a triangular tubuler member for passage of said string.

5. The retractable wheel assembly as claimed in claim 1, wherein said L-shaped bracket is provided with a tubular portion for passage of said string.

* * * * *